(12) United States Patent
Nomura et al.

(10) Patent No.: US 6,623,210 B2
(45) Date of Patent: Sep. 23, 2003

(54) GUIDANCE METHOD AND GUIDANCE SYSTEM OF FLOOD WATER

(76) Inventors: Yasuhiro Nomura, 502 Maison Riviere, 2-15-13 Nishikawa, Amagasaki-shi, Hyougo-ken (JP); Kazuo Yano, 898-9 Shinmachi, Yamato, Kooriyama-shi, Nara-ken (JP)

(*) Notice: Subject to any disclaimer, the term of this patent is extended or adjusted under 35 U.S.C. 154(b) by 0 days.

(21) Appl. No.: 10/056,042

(22) Filed: Jan. 28, 2002

(65) Prior Publication Data

US 2002/0106246 A1 Aug. 8, 2002

(30) Foreign Application Priority Data

Jan. 31, 2001 (JP) .......................... 2001-23947

(51) Int. Cl.[7] .............. E02B 3/10; E02B 7/36
(52) U.S. Cl. .................. 405/107; 405/92; 405/106; 52/64; 52/169.2
(58) Field of Search ................ 405/87, 92, 94, 405/99–107; 52/1, 64–72, 169.1, 169.2, 169.9, 380, 383

(56) References Cited

U.S. PATENT DOCUMENTS

| | | | | |
|---|---|---|---|---|
| 283,120 | A | 8/1883 | Lauth et al. ................. | 109/47 |
| 661,226 | A | 11/1900 | Post ........................... | 109/47 |
| 671,424 | A | 4/1901 | Nicolle ....................... | 109/47 |
| 1,759,129 | A | 5/1930 | McClintok et al. ........... | 109/47 |
| 1,778,857 | A | 10/1930 | James ......................... | 109/47 |
| 1,863,040 | A | 6/1932 | Cisor .......................... | 109/47 |
| 1,954,667 | A | 4/1934 | Ernst .......................... | 109/47 |
| 4,022,137 | A | 5/1977 | Chiu ........................... | 109/47 |
| 4,625,658 | A | 12/1986 | Hodges ....................... | 109/47 |
| 4,942,954 | A | 7/1990 | Nesser et al. ................ | 109/47 |
| 5,179,901 | A | 1/1993 | Adcock ...................... | 109/47 |
| 5,460,462 | A | * 10/1995 | Regan ......................... | 405/92 |
| 5,711,231 | A | 1/1998 | Couvrette et al. ............ | 109/47 |
| 5,836,256 | A | 11/1998 | Senterfeit, Sr. .............. | 109/47 |
| 6,338,594 | B1 | * 1/2002 | Adler et al. .................. | 405/92 |

* cited by examiner

*Primary Examiner*—Thomas B. Will
*Assistant Examiner*—Tara L. Mayo
(74) *Attorney, Agent, or Firm*—Armstrong, Westerman & Hattori, LLP

(57) ABSTRACT

A guidance system for protecting a specific zone as a safety zone against flood water while protecting landscapes near the specific zone from deteriorization. According to the described flood water guidance system, a guidance plate (5, 5, ...) is positioned under underground in the vicinity (S'1, S'2, S"1) of an upstream side of a specific zone (SI, S2) containing property to be protected and where it is anticipated that flood water will flow, and when flood water is generated, or when there is a possibility that flood water may be generated, the guidance plate (5, 5, ...) is raised to a predetermined height above the surface of the earth, in order that a specific zone (S1, S2) is protected as a safety zone by diverting the flood water from the specific zone (S1, S2) by way of the raised guidance plate (5, 5, ...), and by guiding the flood water to a retarding basin, a drainage canal, and the like.

3 Claims, 3 Drawing Sheets

Figs. 2
Fig. 2 (A)
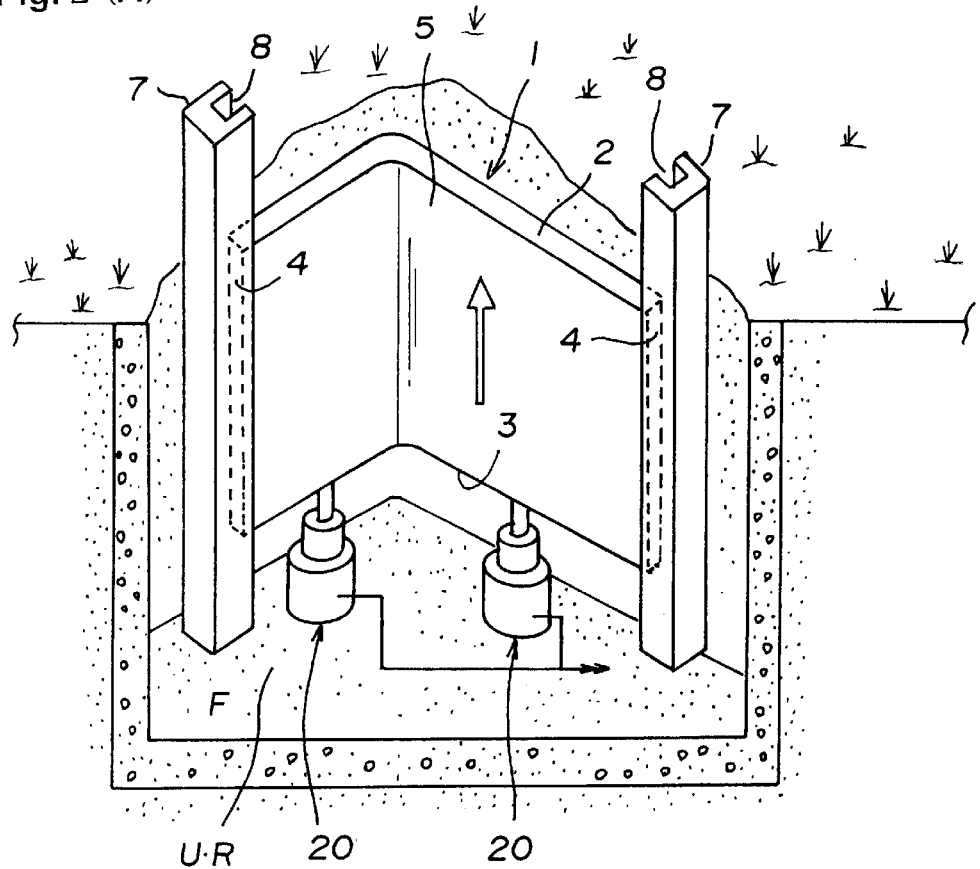
Fig. 2 (B)
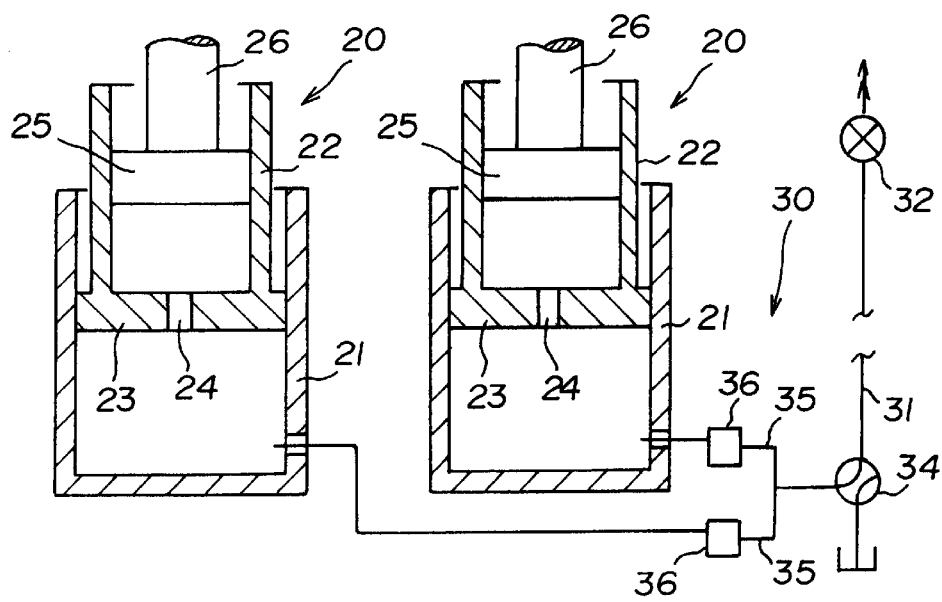

GUIDANCE METHOD AND GUIDANCE SYSTEM OF FLOOD WATER

BACKGROUND OF THE INVENTION

1. Field of the Invention

The present invention relates to a guidance method of flood water for protecting, from flood water, a specific zone where a general residence and public facility, such as a school are built, as a safety zone. The invention also relates to a guidance system of flood water used for carrying out the guidance method.

2. Description of the Prior Art

One of the basic plans of Japanese river improvement administration is to flow rain water or flood water to the sea swiftly. Another basic plan is not to collect the rain water and not to flow the water at once. In accordance with these basic plans, many rivers were repaired in the shape of a straight line, and the banks were restrained by a stone wall and concrete. Morever, many dams have been built at the upstream of a big river.

It is granted that drainage of the river which was modified into a straight shape and having banks restrained by means of concrete has been enhanced. Further, it is also granted that a dam is built at upstream and flood of river has been prevented in some degree. However, natural environment of mountain where the dam was built is destroyed, and the river where the bank was restrained by means of concrete, stone wall, and the like, is turned into the artificial waterway. And the fishes living in river decrease in number, and the animals living around the bank of river are extinct or seriously endangered. Even if river improvement which destroys environment is carried out, damage by a flood is caused like Tokai heavy rain on September, 1999. It must be granted that there is a limit in the river improvement method for collecting flood water or rain water into a dam, and in the river improvement method for pushing rain water into river. The above fact is recognized in the U.S. and Europe, and it is granted that there is a possibility that river overflows, and the river improvement method has been changed into a direction that does not oppose the nature. In reply to this change, Japanese River Council of the Ministry of Construction submitted a response at the end of 1999 to the effect that the river improvement should be proceeded in the entire drainage area on the assumption that a river floods.

SUMMARY OF THE INVENTION

The present invention has been accomplished in view of the above facts of flood and the reply, and it is an object of the present invention to provided a guidance method of flood water for protecting and a guidance system of flood water used for carrying out the guidance method which protects, from flood water, specific zones where general residences and public facilities such as schools are built, as safety zones even if river or sea water overflows. More specifically, it is an object of the invention to provide a guidance method of flood water for protecting and a guidance system of flood water used for carrying out the guidance method in which specific zones are protected as safety zones from the flood water without deteriorating landscapes of the specific zones. In addition to the above object, it is another object of the invention to provided an inexpensive guidance method of flood water for protecting and an inexpensive guidance system of flood water used for carrying out the guidance method in which a specific zone is protected as a safety zone from the flood water even at the time of power failure.

The above objects are achieved by a structure in which a guidance plate is buried in underground where it is expected to be upstream of water flow when a bank of river, reservoir or port is destroyed, and the guidance plate is raised to a surface of earth when the flood water flows, or flowed or is expected to flow, thereby guiding the flood water into a predetermined direction by means of the guidance plate. Further, relatively high-rise buildings such as school and building are equipped with water tanks such as water tank and tank for disaster prevention. Therefore, the water in such a water tank may be used. If the water in the water tank is used, the guidance plate can be driven upwards also in case of emergency when tap water can not be obtained. To achieve the above objects, according to a first aspect of the present invention, there is provided a guidance method of flood water wherein a guidance plate is laid under underground in the vicinity of upstream side of a specific zone where a general residence, a school, a public facility like a hospital or the like is built and where it is anticipated that the flood water flows, and when flood water is generated, or when there is a possibility that flood water may be generated, the guidance plate is raised to a predetermined height of surface of the earth, a specific zone is secured as a safety zone by diverting the flood water from the specific zone by means of the raised guidance plate, and by guiding the flood water to a retarding basin, a drainage canal, and the like. According to a second aspect of the invention, the guidance plate is raised by water pressure, such as tap water and impounded water. According to a third aspect of the invention, there is provided a guidance system of flood water comprising a guidance plate provided under underground in the vicinity of upstream side of a specific zone where a general residence, a school, a public facility like a hospital or the like is built and where it is anticipated that the flood water flows, the guidance plate diverting the flood water from the specific zone and guiding the flood water to a retarding basin, a drainage canal, and the like, and the guidance system further comprising a drive system for driving the guidance plate to a predetermined height position of surface of the earth, wherein the drive system comprises a piston cylinder unit which is operated by water pressure such as tap water and impounded water.

BRIEF DESCRIPTION OF THE DRAWINGS

FIG. 2 show a first embodiment of the invention, wherein FIG. 2(A) is a schematic perspective view showing the entire guidance system, and FIG. 2(B) is a schematic sectional view showing a hydraulic piston cylinder unit.

DESCRIPTION OF THE PREFERRED EMBODIMENTS

Figure 1:
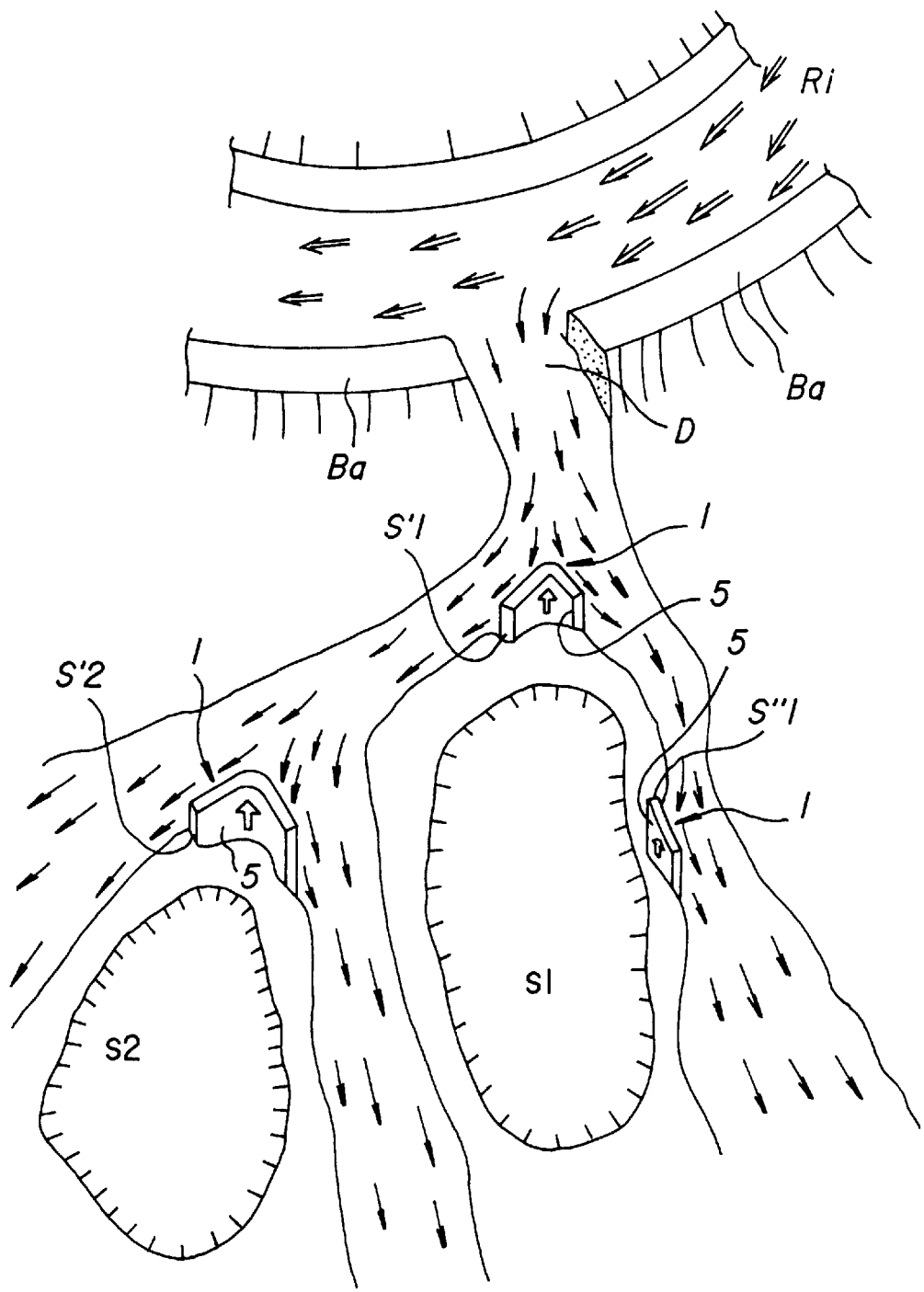
FIG. 1 is a schematic perspective view of burying position of a guidance system of flood water according to an embodiment of the present invention and an operation state of the guidance system.

Embodiments of the present invention will be explained with reference to the accompanying drawings below. FIG. 1 is a perspective view showing places where guidance systems 1 for flood water of the invention are disposed, In FIG. 1, a reference symbol Ri represents river, reference symbols SI and S2 represent first and second safety zones or specific zones where exist public facilities such as general residence, school and library. Since the river Ri is bent at a point D, if a bank Ba is broken, it is expected that a portion of the flowing water flows as flood water toward the first and second specific zones S1 and S2 located lower than the bank Ba. Thereupon, the guidance systems 1 according to the present embodiment are buried underground in the vicinity of upstream ends S'1 and S'2 of the first and second specific zones S1 and S2, and in the vicinity of a portion S"1 where it is expected that the water bypasses and flows toward a side of the first specific zone S1. When the bank Ba is actually broken and flood water flows, or when there is an adverse possibility that the river overflows, guidance plates 5, 5 are driven to a predetermined height position with respect to the road surface from an underground room, and the flood water is guided to a retarding basin, a tailrace or the like. With this, the first and second specific zone S1, S2 are protected against the flood water as safety zones. The flood water which is guided by the guidance plates 5, 5 and allowed to flow in this manner is shown with a large number of arrows in FIG. 1.

The guidance system 1 of flood water according to a first embodiment includes a guidance plate 5. The guidance plate 5 has an upper end edge 2, a lower end edge 3 and opposite side edges 4, 4, and is bent substantially at right angles. The upper end edge 2 of the guidance plate 5 is a portion of the road surface in a state where the upper end edge 2 is stored an underground room UR which will be described later. Therefore, the upper end edge 2 has the same color as that of the road surface therearound or is covered with lawn. First and second hydraulic piston cylinder units 20, 20 are mounted to the lower end edge 3 as will be described later, and the opposite side edges 4, 4 are guide portions. The guidance plate 5 having the above structure is stored or buried in the underground room UR located at a predetermined upstream position where it is expected that the flood water flows, and in case of an emergency, the guidance plate 5 is driven to the predetermined height position from the road surface. A pair of guidance columns 7, 7 which guide the guidance plate 5 and receives water pressure of the flood water extend to a predetermined height of the road surface from a floor surface F of the underground room UR at a predetermined distance from each other. The guidance columns 7, 7 are formed with recess grooves 8, 8 which guide the opposite side edges 4, 4 of the guidance plate 5 in the longitudinal direction. The guidance columns 7, 7 stand on the floor surface F such that the recess grooves 8, 8 are opposed to each other.

A driving apparatus which drives the guidance system 1 toward the road surface comprises first and second hydraulic piston cylinder units 20, 20 in this embodiment and thus, only one of them, i.e., the first hydraulic piston cylinder unit 20 will be explained, and for the other piston cylinder unit 20, only reference symbols are designated and explanation thereof will be omitted. The first hydraulic piston cylinder unit 20 is formed into a telescopic structure. That is, in accordance with the embodiment shown in FIG. 2(B), the driving apparatus comprises first and second hydraulic cylinders 21, 22. More specifically, the driving apparatus comprises, the first hydraulic cylinder 21 which is fixed to the underground room UR and which has relatively large diameter, the second hydraulic cylinder 22 which is provided in the first hydraulic cylinder 21 such that the second hydraulic cylinder 22 can reciprocate therein, a piston 25 provided in the second hydraulic cylinder 22 such that the piston 25 can reciprocate therein, and a piston rod 26 which is integrally formed on the piston 25. A bottom of the second hydraulic cylinder 22 is formed with a through hole 24, the bottom functions as a piston portion 23, and this piston portion 23 comes into close contact with an inner peripheral surface of the first hydraulic cylinder 21 and reciprocates. An upper end of the piston rod 26 having the above structure is fixed to a lower edge 3 of the guidance plate 5. Therefore, if tap water is supplied from a water feed pipe 35, the tap water supplied to a piston head chamber of the first hydraulic cylinder 21 passes through the through hole 24 and is also supplied to a piston head chamber of the second hydraulic cylinder 22. With this feature, although rising speed or lifting power and the like of the second water pressure cylinders 23 and the pistons 25 differ because of a difference in pressure-receiving surfaces of the piston 25 and the piston portion 23 of the second water pressure cylinder 22, and because of a difference in volume of the piston head chambers of the piston 25 and the piston portion 23, the piston rod 26 finally rises, and the guidance plate 5 is driven to the predetermined position.

As shown in FIG. 2(B), the feed water supply system 30 includes a feed pipe 31. One end of the feed pipe 31 is connected to a water supply pipe through an open/close valve 32. A cross valve 34, a check valve and the like (not shown) are provided on the other end of the feed pipe 31. The feed pipe 31 is branched into two branch pipes 35 and 35. Orifices 36 and 36 are provided on the branch pipes 35 and 35, and the branch pipes 35 and 35 are respectively connected to the piston head chambers of the first water pressure cylinders 21 and 21 of the first and second water pressure type piston cylinder units 20 and 20. Since the orifices 36 and 36 are provided on the branch pipes 35 and 35 in this manner, if a difference in the rising position of the first and second water pressure type piston cylinder units 20 and 20 is generated, a difference in pressure of the piston head chambers of the first and second water pressure type piston cylinder units 20 and 20 is also generated due to a difference in driving force. If the difference is caused, a pressure difference between inlet side and outlet side of the orifices 36 and 36 is also changed. As a result, water amount flowing through the orifices 36 and 36 is changed. With this, the first and second water pressure type piston cylinder units 20 and 20 are driven with the same water amount and in the same manner.

According to this embodiment, an on/off valve 32 is disposed in the safety zone. Thus, it is possible to open the on/off valve 32 to supply the tap water to the first and second hydraulic piston cylinder units 20, 20, and to drive the guidance plate 5 to the upper predetermined position, from a safety place without being exposed to danger such at the time of overflowing of river. The cross valve 34 can be disposed in the safety zone. Further, since the check valve is provided, even if the supply of tap water is stopped by any reason, the guidance plate 5 is not lowered unintentionally. One pipe of the cross valve 34 is opened at a drain groove.

Next, operation will be explained. The guidance plates 5, 5 are buried in the predetermined positions as described above. In a normal state, a function of the check valve is canceled, and a state of the cross valve 34 shown in FIG. 2(B) is switched to a state in which water can be discharged. With this operation, water in the first and second water pressure type piston cylinder units 20 and 20 is discharged into the ditch D through the check valve and the cross valve 34. The guidance plate 5 is lowered until it abuts against the support member or the stopper by its own weight (this state is not shown in FIG. 2), and the upper end edges 2 of the guidance plates 5, 5 come to substantially the same height as that of the road surface. With this, the upper end edges 2 of the guidance plates 5, 5 become a portion of the road surface, and it is unnecessary to be aware that the guidance plates 5, 5 are buried in the underground room UR. Landscapes therearound are not deteriorated. The guidance columns 7, 7 are guides for the guidance plates 5, 5.

When the bank Ba of the river Ri is broken and water overflows, or when there is an adverse possibility of overflowing from judgement of an amount of rain water or the like, the cross valve 34 is switched to a position shown in FIG. 2(B), and the on/off valve 32 is opened. With this, tap water is equally supplied to the first and second hydraulic piston cylinder units 20, 20 by the above-described reason. The second hydraulic cylinders 22, 22 and the pistons 25, 25 are driven to predetermined height positions of the road surface. With this, the flow of the flood water is forcibly changed by the guidance plates 5, 5, and the flood water is guided toward the retarding basin, tailrace or the like. The flood water which is guided by the guidance plates 5, 5 and allowed to flow in this manner is shown with a large number of arrows in FIG. 1.

Stoppers (not shown in FIG. 2) are mounted to the first and second hydraulic piston cylinder units 20, 20 or the guidance columns 7, 7 for limiting the upward driving amount of the guidance plates 5, 5. Therefore, even if the supply of tap water is continued, the guidance plates 5, 5 stop at the predetermined positions. At that time, since the pressure of the tap water is relatively low, the first and second hydraulic piston cylinder units 20, 20 and the like are not broken. The water feed pipe may be provided with a relief valve for safety if necessary.

Figure 3:
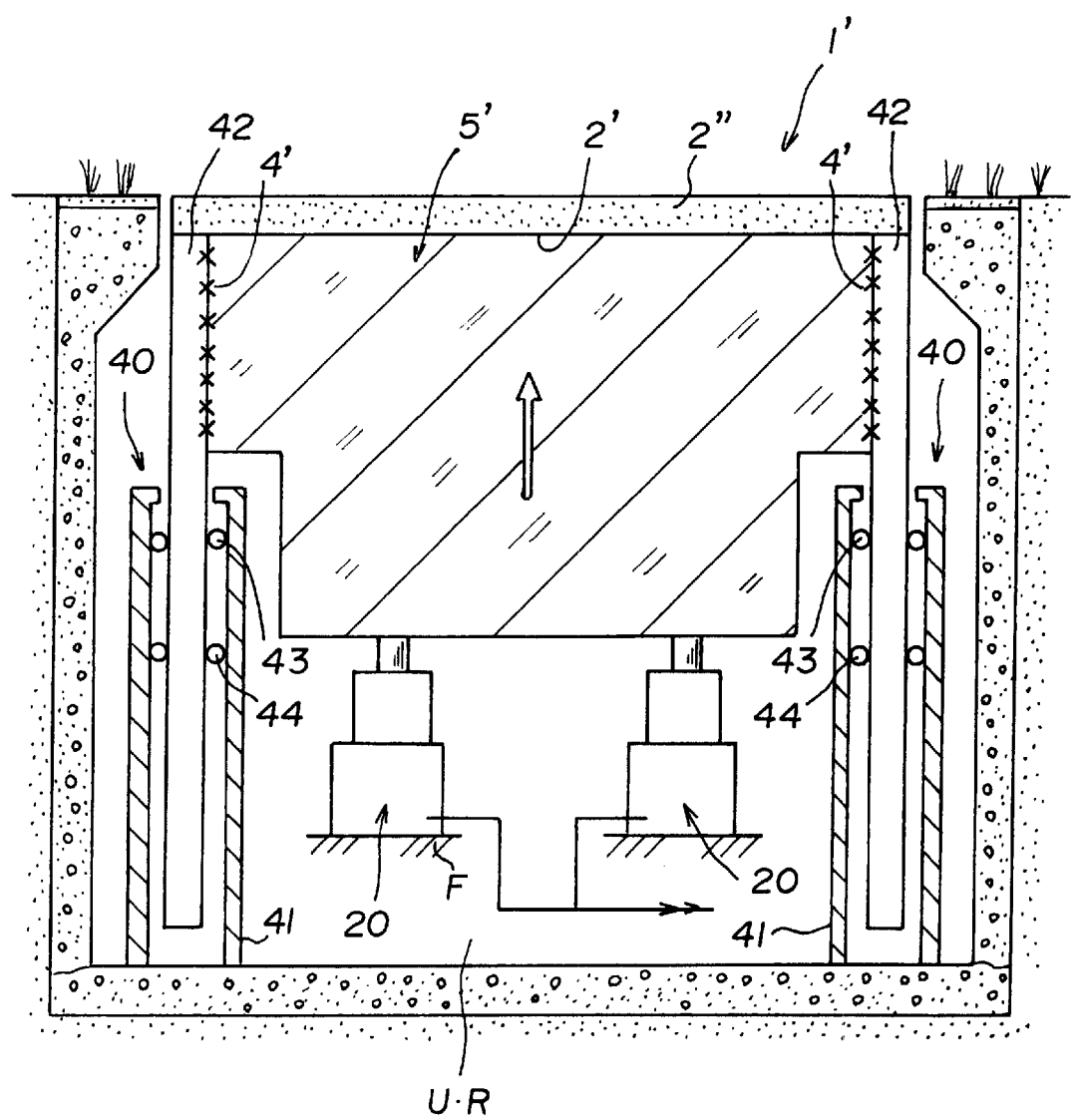
FIG. 3 is a partially sectional schematic front view of a second embodiment of the invention.

Next, a second embodiment of the present invention will be explained with reference to FIG. 3. The same constituent elements as those in the first embodiment are designated with the same reference numbers or characters, or dash "'" is added to the reference numbers or characters, and the same explanation is omitted. According to the second embodiment, a pair of guidance columns 40, 40 are usually accommodated in the underground room. When a guidance plate 5' is driven toward the road surface, the guidance columns 40, 40 are also driven toward the road surface in a telescopic manner. That is, each of the guidance columns 40, 40 comprises a cylindrical guide member 41 of predetermined length fixed to the floor surface F of the underground room UR, and a support column 42 which is telescopically inserted into the guide member 41. A pair of guide rollers 43, 44 are mounted to an inner side portion of an upper portion of the guide member 41 at a predetermined distance from each other in the vertical direction such that the support column 42 is guided by the guide rollers 43, 44. Side edges 4', 4' of the guidance plates 5, 5 are fixed to upper portions of the support columns 42, 42 which are guided in the vertical direction. According to this embodiment, the guidance plate 5' is of flat plate shape.

It is obvious that the second embodiment also exhibits the same effect. That is, if tap water is supplied to the first and second hydraulic piston cylinder units 20, 20, it is obvious that the guidance plate 5' is driven upward and the support columns 42, 42 extend in association with this movement. At that time, since the support columns 42, 42 are supported by the pair of guide rollers 43, 44 disposed at a distance from each other in the vertical direction, it is obvious that the water pressure of the flood water can be received. When there is an adverse possibility that great water pressure of the flood water is received, a plurality of guidance columns may be provided on a back surface of the guidance plate. According to this embodiment, since the guidance columns 40, 40 are also buried in the underground room UR, landscapes are not deteriorated by the guidance system of flood water. In order to maintain the landscapes more excellently, soil 2" may be placed on the upper end edge 2' of the guidance plate 5', and lawn or the like may be planted to cover the guidance plate 5'.

The present invention can be variously carried out without being limited to the first and second embodiments. For example, when the water supply tank is disposed at a high position, if the water feed pipe is connected to the water supply tank, it is possible to drive the guidance plate even if the tap water is stopped. When a rain water tank, a disaster prevention tank or the like is provided, the water feed pipe may be connected to such a tank. Further, if a water pipe connected to the water supply tank, the rain water tank or the like is connected to a tap water pipe in parallel, there is a merit that the guidance plate can be driven by any of the tanks. The guidance plate can also be driven by an electric motor, an internal combustion engine or the like depending upon the burying position.

A pressure compensation type flow rate adjusting valve may be provided instead of the orifices so that equal amount of water can be supplied to the first and second water pressure type piston cylinder units. It is apparent that the number of water pressure type piston cylinder units is not limited to that shown in the embodiments. According to the embodiment, although the running water is supplied to the water pressure type piston cylinder units, water pressure of the running water is not high. Therefore, the water pressure type piston cylinder units can be made of reinforced plastic which is not subject to corrosion. In that case, maintenance of the unit is easy. The water feed pipe of the hydraulic piston cylinder unit may be provided with an automatic control valve which is operated by remote control, and a safety valve may be provided so that the guidance plate is not operated unintentionally. Although constituent material of the guidance plate is not especially mentioned in the above embodiments, the guidance plate may be made of stainless steel or synthetic resin which is not subject to corrosion. It is obvious that the shape of the guidance plate is not limited to that described in the embodiments.

As described above, according to the present invention, a guidance plate is buried in underground where it is expected to be upstream of water flow when a bank of river, reservoir or port is destroyed, and the guidance plate is raised to a surface of earth when the flood water flows, or flowed or is expected to flow, thereby guiding the flood water into a predetermined direction by means of the guidance plate. Further, relatively high-rise buildings such as school and building are equipped with water tanks such as water tank and tank for disaster prevention. Therefore, even if the flood water overflows, the specific zone can be secured as the safety zone which is the specific effect of the present invention. Thus, according to the present invention, the specific zone can be protected against flood water without destroying the natural environment by building many dams around the upstream of river, or solidifying the bank of the river with concrete. According to another invention, since the guidance plate is driven by water pressure of tap water or reserved water, the guidance system of floodwater is inexpensive, and the specific zone is protected as safety zone against flood water in case of emergency like a power failure. Further, since the guidance system of flood water is buried underground, landscapes near the specific zone is not deteriorated.

What is claimed is:

1. A guidance system for diverting flood water from a selected zone to be protected to a drainage conductor, comprising:

a guidance plate disposed in the vicinity of an upstream side of the selected zone to be protected, means forming a chamber disposed below ground and configured to receive said guidance plate in a position at which a top of said guidance plate is normally positioned below ground, and a drive system including at least one drive device having a water operated piston-cylinder unit including a fixed first water pressure cylinder having an opening communicating with a source of feed water, a first piston movable in said first water pressure cylinder, a second water pressure cylinder integrally formed with said first piston and movable therewith, a through-hole in said first piston establishing fluid communication between the interior of said first water pressure cylinder and said second water pressure cylinder, and a piston movable in said second water pressure cylinder having a piston rod operatively connecting with said guidance plate for moving said guidance plate between said chamber to a predetermined height above ground.

2. The guidance system according to claim 1 including a plurality of guidance plates and in which said drive system includes a plurality of drive devices, each being connected by separate supply lines between said source of feed water to an associated guidance plate, and an orifice disposed in each of said supply lines for regulating the supply of feed water to each drive device.

3. The guidance system according to claim 1 in which said feed water is any one or more of tap water and impounded water.

* * * * *